United States Patent
Baozhen et al.

[11] Patent Number: 5,993,989
[45] Date of Patent: Nov. 30, 1999

[54] INTERFACIAL MATERIAL FOR SOLID OXIDE FUEL CELL

[75] Inventors: Li Baozhen, Essex Junction, Vt.; Roswell J. Ruka, Pittsburgh; Subhash C. Singhal, Murrysville, both of Pa.

[73] Assignee: Siemens Westinghouse Power Corporation, Orlando, Fla.

[21] Appl. No.: 08/826,715

[22] Filed: Apr. 7, 1997

[51] Int. Cl.⁶ .............................. H01M 8/12; H01M 4/86
[52] U.S. Cl. ............................. 429/41; 429/31; 429/33; 429/40; 427/115
[58] Field of Search ............................. 429/41, 31, 33, 429/40; 427/115

[56] References Cited

U.S. PATENT DOCUMENTS

| | | | |
|---|---|---|---|
| 4,459,340 | 7/1984 | Mason | 429/13 |
| 4,547,437 | 10/1985 | Isenberg et al. | 429/30 |
| 4,692,274 | 9/1987 | Isenberg et al. | 252/521 |
| 5,106,706 | 4/1992 | Singh et al. | 429/31 |
| 5,518,830 | 5/1996 | Worrell et al. | 429/31 |
| 5,589,285 | 12/1996 | Cable et al. | 429/13 |
| 5,725,965 | 3/1998 | Wachsman et al. | 429/33 |

FOREIGN PATENT DOCUMENTS

| | | | |
|---|---|---|---|
| 188 868 | 9/1985 | European Pat. Off. | H01M 4/90 |
| 639 866 | 8/1994 | European Pat. Off. | H01M 8/12 |
| 04 323 376 | 11/1992 | Japan | C01B 13/14 |
| 096791 | 4/1994 | Japan | H01M 8/10 |
| 006774 | 1/1995 | Japan | H01M 8/02 |

OTHER PUBLICATIONS

P. Han et al., "Mixed–Conducting; Oxides in Solid Oxide Fuel Cells", EPRI/GRI Fuel Cell Workshop on Fuel Cell Technology Research and Development, Atlanta, Georgia (1994).

Soral, P., et al. "Comparison of Power Densities and Chemical–Potential Variation in SOFC's with Multi–Layer and Single–Layer Oxide Electrolytes," Proceedings of the Electrochemical Society, vol. 97–40, pp. 264–273, May 1997.

*Primary Examiner*—Maria Nuzzolillo
*Assistant Examiner*—Jonathan Crepeau

[57] ABSTRACT

Solid oxide fuel cells having improved low-temperature operation are disclosed. In one embodiment, an interfacial layer of terbia-stabilized zirconia is located between the air electrode and electrolyte of the solid oxide fuel cell. The interfacial layer provides a barrier which controls interaction between the air electrode and electrolyte. The interfacial layer also reduces polarization loss through the reduction of the air electrode/electrolyte interfacial electrical resistance. In another embodiment, the solid oxide fuel cell comprises a scandia-stabilized zirconia electrolyte having high electrical conductivity. The scandia-stabilized zirconia electrolyte may be provided as a very thin layer in order to reduce resistance. The scandia-stabilized electrolyte is preferably used in combination with the terbia-stabilized interfacial layer. The solid oxide fuel cells are operable over wider temperature ranges and wider temperature gradients in comparison with conventional fuel cells.

19 Claims, 5 Drawing Sheets

5,993,989

INTERFACIAL MATERIAL FOR SOLID OXIDE FUEL CELL

GOVERNMENT CONTRACT

The United States government has rights in this invention pursuant to Contract No. DE-FC21-91MC28055 awarded by the United States Department of Energy.

BACKGROUND OF THE INVENTION

1. Field of the Invention

The present invention relates to solid electrolyte electrochemical cells, and more particularly relates to solid oxide fuel cells which are operable over a wide temperature range.

2. Background Information

High temperature solid oxide fuel cells (SOFC) have demonstrated the potential for high efficiency and low pollution in power generation. However, some problems remain associated with the high temperature processing and operation of such conventional cells. For example, any interaction between the lanthanum oxide-based perovskite air electrode (AE) and the zirconia-based electrolyte (EL) to form a low conducting compound at the AE/EL interface increases both cell resistance and the air electrode polarization, which can seriously affect the cell performance and result in loss of SOFC power. One technique to avoid such interaction is to apply an interfacial material at the AE/EL interface which does not increase cell resistance or increase air electrode polarization. As disclosed in U.S. Pat. No. 5,106,706 to Singh et al., which is incorporated herein by reference, the use of ceria as an AE/EL interface material has proven effective in improving high temperature SOFC performance. However, the thermal expansion match with the electrolyte and the electrical conduction characteristics of the interface modifier need further improvement.

Successful operation of SOFCs for power generation has been limited to temperatures of around 1000° C. due to insufficient electrical conduction of the electrolyte and high air electrode polarization loss at lower temperatures. U.S. Pat. Nos. 4,547,437 and 4,692,274 to Isenberg et al., which are incorporated herein by reference, disclose solid oxide fuel cells operable at relatively high temperatures. Increased versatility in generator design and operation would result if the SOFCs could operate over a wider temperature range and under a wider temperature gradient. In addition to large-scale power generation, SOFCs operable at lower temperatures would be useful in additional applications such as in powering light-duty vehicles.

Conventional solid oxide fuel cells which incorporate yttria stabilized zirconia (YSZ) electrolytes have shown good performance at high temperatures of around 1000° C. owing to the chemical stability and adequate ionic conduction of YSZ. However, with a decrease in operating temperature, the power losses increase, resulting from the substantial increase in the YSZ bulk ionic resistance, the electrolyte/electrode interfacial resistance and the electrode reaction polarization. The high temperature operation also sets limitations on generator materials, which can increase costs.

In order to allow SOFCs to operate at lower temperatures, the use of ultrathin film YSZ and non-zirconia based electrolytes, such as those based on ceria, have been explored. While the application of ultrathin film YSZ electrolytes of a few microns or thinner does reduce the bulk electrolyte resistance to some extent, such ultrathin films reduce the cell long-term reliability and the resistance to gas and electron leakage through the electrolyte. The use of ceria-based electrolytes requires major modifications of the other SOFC components, such as the air electrode and interconnection, to achieve a thermal expansion match. Moreover, ceria-based electrolytes demonstrate significant electronic conduction in fuel atmospheres, resulting in substantial non-power generating fuel consumption.

SUMMARY OF THE INVENTION

In accordance with one embodiment of the present invention, the above-noted problems are solved by applying an interfacial material at the AE/EL interface which does not adversely increase cell resistance or air electrode polarization. The interfacial material provides a barrier which controls the AE/EL interaction. It also acts as an interfacial modifier to reduce the polarization loss through the reduction of the AE/EL interfacial electrical resistance. The interfacial material is substantially chemically inert to both the electrolyte and the air electrode materials such that deleterious interactions are prevented. The interfacial material also is a good electronic and oxide ionic mixed conductor.

The interfacial material preferably comprises a zirconia-based mixed conductor of the formula $Zr_{1-x-y}Y_xTb_yO_z$, wherein x preferably ranges from about 0.12 to about 0.2, y preferably ranges from about 0.15 to about 0.5, and z is less than 2. The value of z depends on the oxygen partial pressure to which it is exposed. Such compounds may be referred to as "YZTb" or terbia/yttria stabilized zirconia. Such compounds exhibit oxide ionic and p-type electronic mixed conduction due to the particular electronic structure of terbium, which results in a $Tb_4O_7$ or $TbO_{1.75}$ composition.

In accordance with another embodiment of the present invention, an improved electrolyte in the form of $Sc_2O_3$-stabilized zirconia (ScSZ) having higher electrical conductivity than conventional yttria-stabilized zirconia (YSZ) is provided. The use of a ScSZ electrolyte combined with an improved interface layer in a solid oxide fuel cell in accordance with the present invention has been found to substantially increase the operable temperature range of the SOFC, by substantially improving the operation at temperatures below 1000° C. The ScSZ electrolyte may be provided as a very thin layer in order to reduce resistance. The ScSZ electrolyte is preferably used in combination with a YZTb interface layer between the air electrode and electrolyte which reduces interfacial resistance and air electrode polarization in the SOFC.

BRIEF DESCRIPTION OF THE DRAWINGS

A full understanding of the invention can be gained from the following description of the preferred embodiments when read in conjunction with the accompanying drawings.

DETAILED DESCRIPTION OF THE PREFERRED EMBODIMENTS

Figure 1:
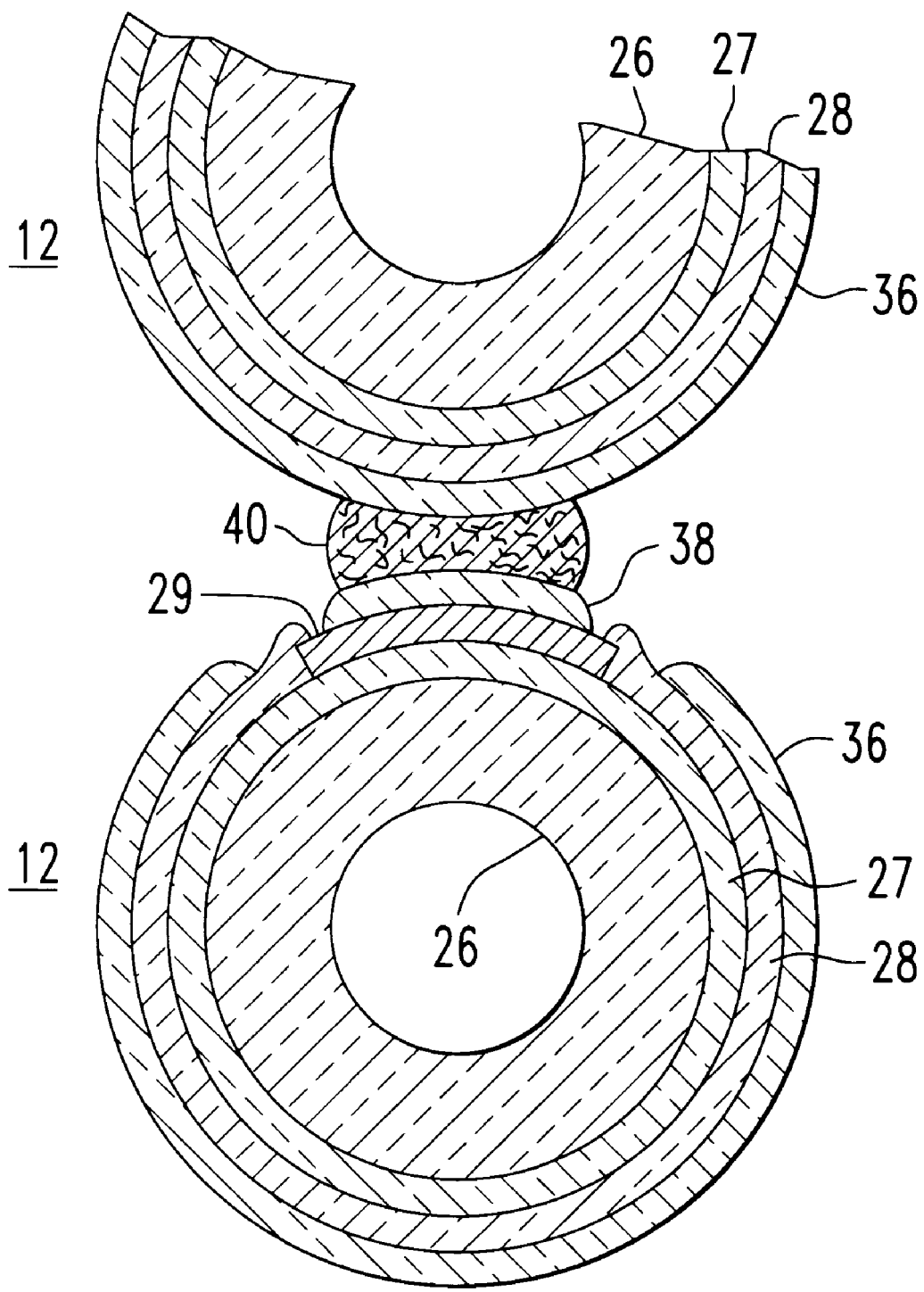
FIG. 1 is a partially schematic, cross-sectional view of a portion of a solid-oxide fuel cell having a layer of interfacial material between the air electrode and electrolyte in accordance with an embodiment of the present invention.
Figure 2:
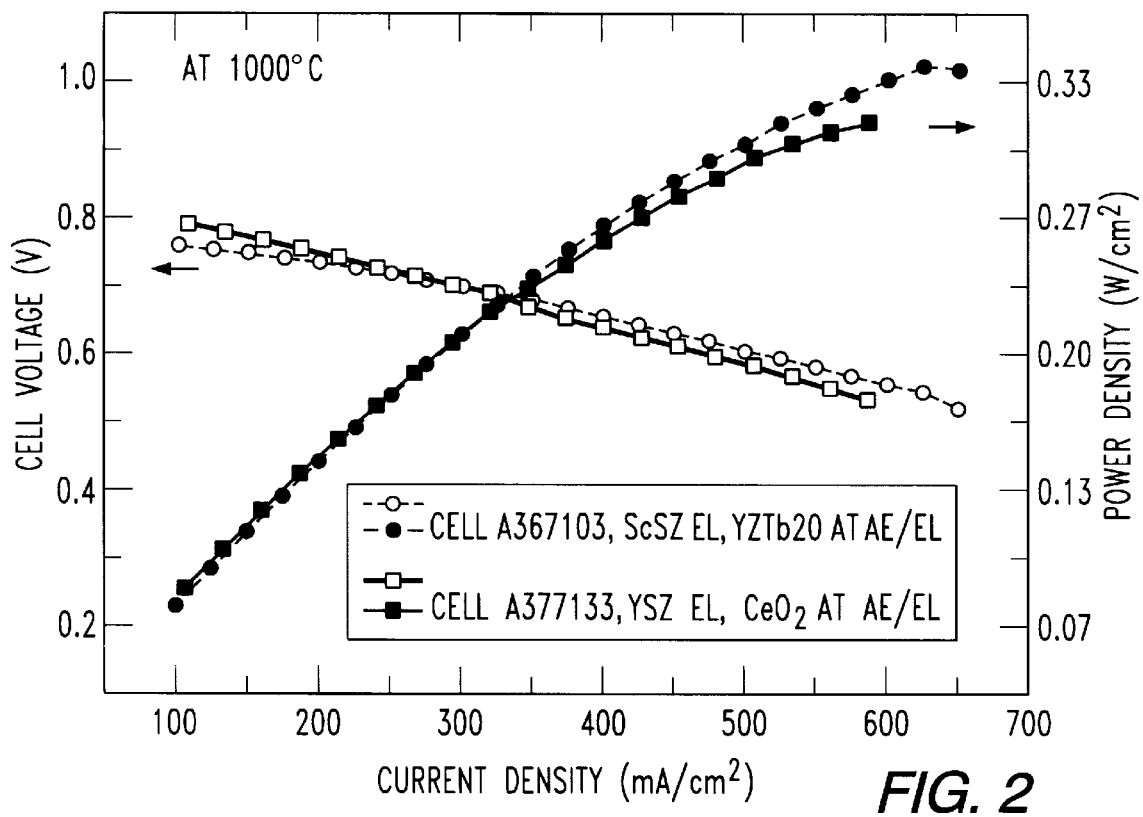
FIG. 2 is a graph showing the electrical performance of a solid oxide fuel cell of the present invention in comparison with a conventional cell at 1000° C.
Figure 3:
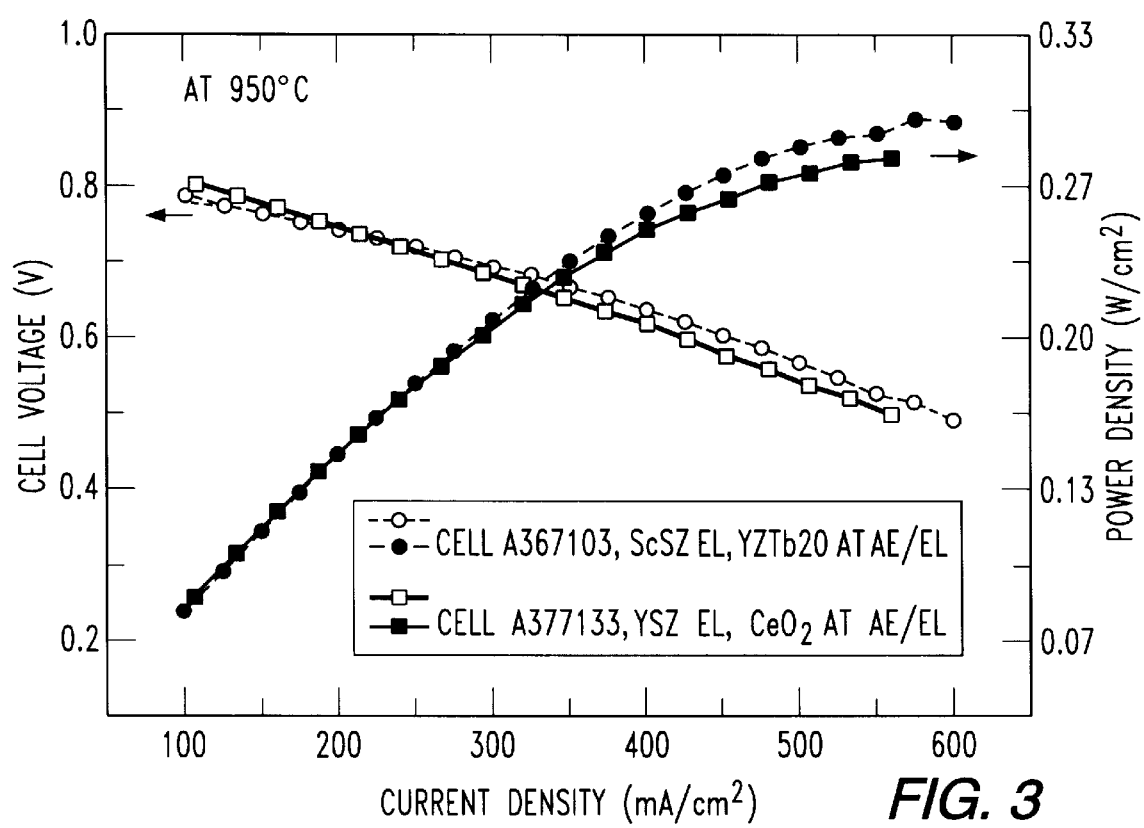
FIG. 3 is a graph showing the electrical performance of a solid oxide fuel cell of the present invention in comparison with a conventional cell at 950° C.
Figure 4:
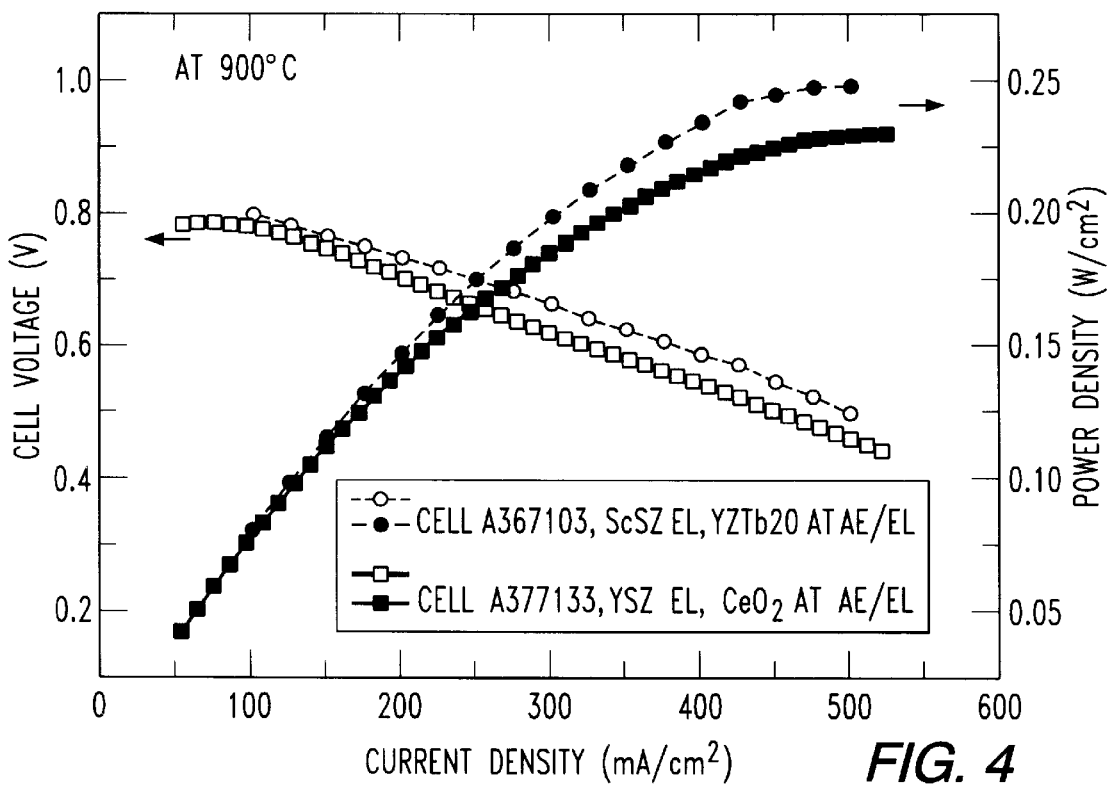
FIG. 4 is a graph showing the electrical performance of a solid oxide fuel cell of the present invention in comparison with a conventional cell at 900° C.
Figure 5:
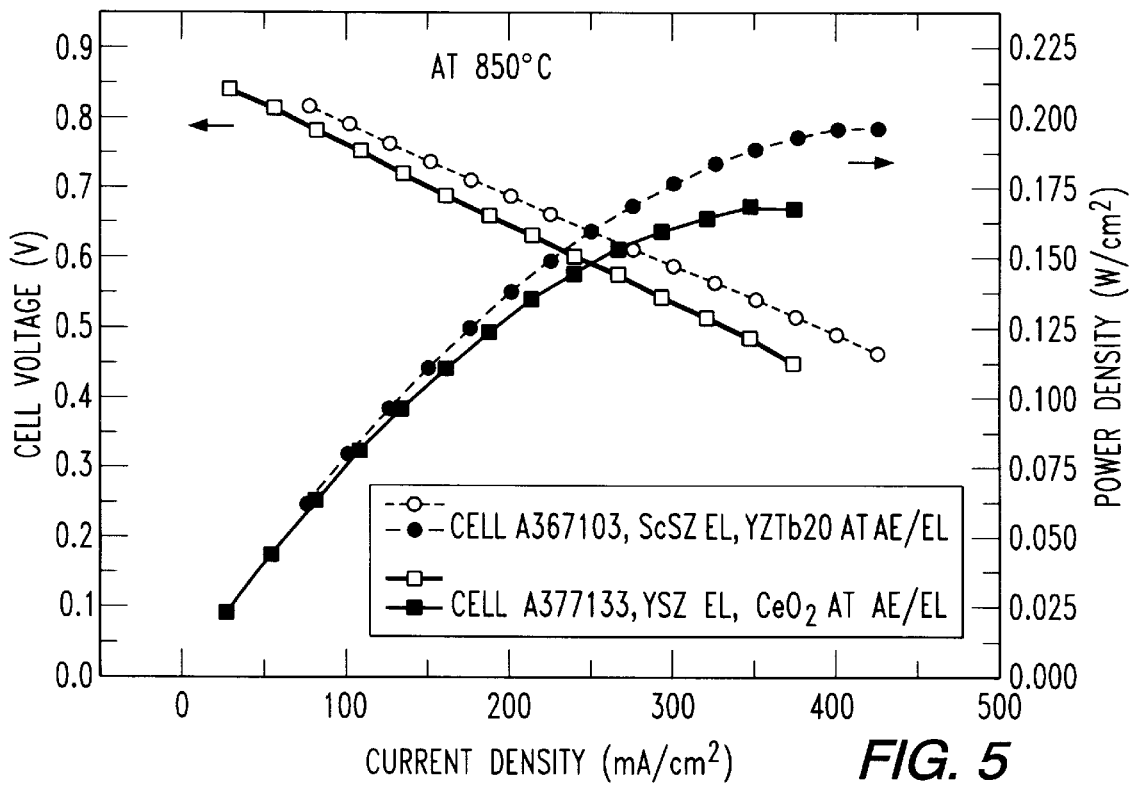
FIG. 5 is a graph showing the electrical performance of a solid oxide fuel cell of the present invention in comparison with a conventional cell at 850° C.
Figure 6:
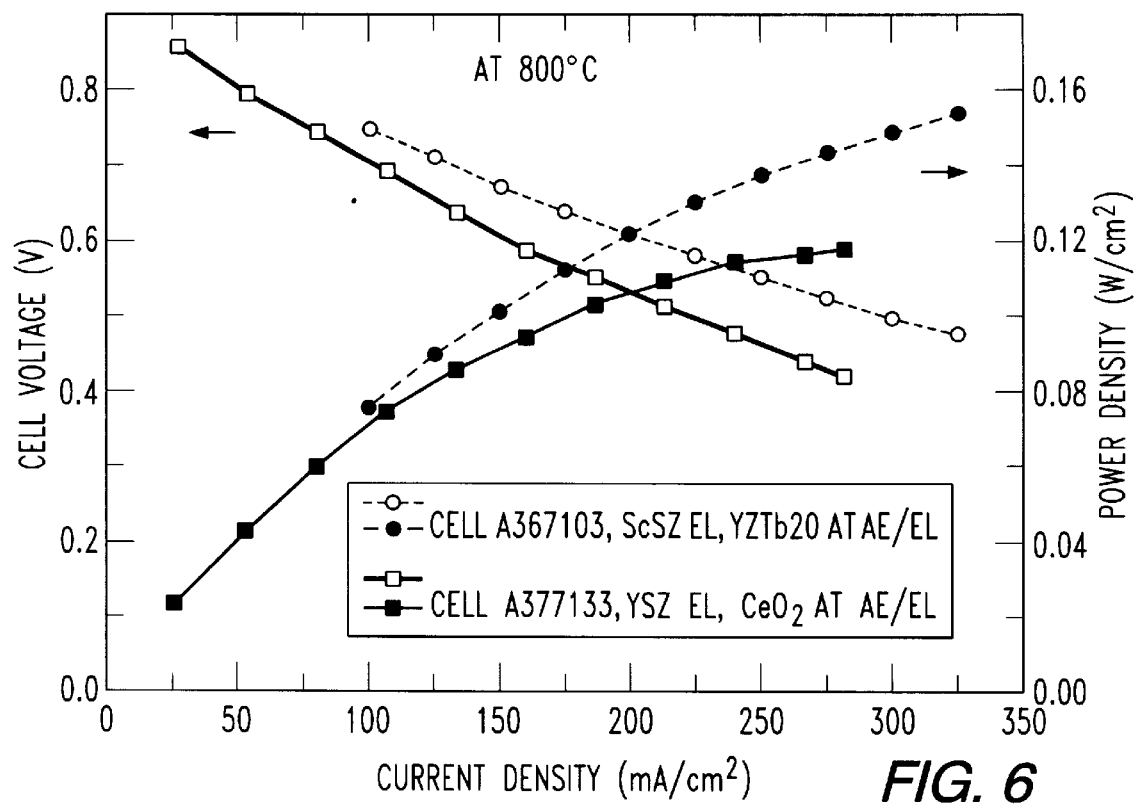
FIG. 6 is a graph showing the electrical performance of a solid oxide fuel cell of the present invention in comparison with a conventional cell at 800° C.

FIG. 1 schematically illustrates a cross section of solid oxide fuel cells 12 of the present invention. In order to better illustrate the components, the layers of the fuel cells 12 are not drawn to scale. Each fuel cell 12 includes a generally cylindrical inner air electrode 26 surrounded by a layer of interfacial material 27 which, in turn, is partially surrounded by a layer of electrolyte material 28. The air electrode 26 may be made of any suitable material such as lanthanum manganite doped with one or more of Ca, Sr, Ce and other rare earths substituting for part of the La, and with Ni, Cr, Fe, Co and Mg substituting for part of the manganese. For example, the air electrode may comprise a material of the formula $La_{1-x-y}Ca_xCe_yMnO_3$, wherein x is 0.4 to 0.55 and y is 0.1 to 0.2. As another example, the air electrode may comprise a solid solution having the general formula $La_{1-x-w-y}(M_L)_x(Ce)_w(Ln)_yMn_{1-z}(M_s)_zO_3$, wherein $M_L$ is selected from the group consisting of Ca, Sr, Ba and mixtures thereof, preferably Ca, Ln is one or a mixture of other lanthanides including Pr, Nd, Sm, Eu, Gd, Dy, Er and Yb, preferably in amounts smaller than the La content, and $M_s$ consists of Ni, Cr, Fe, Co, Al, In, Sn, Mg or mixtures thereof in amounts preferably of from 0 to 20 mole % of the Mn content. In this formula, w preferably ranges from 0 to about 0.2, x preferably ranges from about 0.2 to about 0.55, y preferably ranges from 0 to about 0.5, and z preferably ranges from 0 to about 0.3. The air electrode typically has a perovskite structure of the formula $ABO_3$, wherein the A site comprises La, Ca and Ce and the B site comprises Mn, Cr and Ni. The A site preferably comprises a slight stoichiometric excess of Ce.

The electrolyte layer 28 may comprise any suitable material such as zirconia stabilized with scandia. In the preferred embodiment, the electrolyte layer 28 comprises $Sc_2O_3$-stabilized zirconia. For example, the electrolyte 28 may comprise a material of the formula $Zr_{1-x}Sc_xO_z$, wherein x is from about 0.13 to about 0.26, z is less than 2, and x and z are related by the formula $z=2-x/2$.

An interconnect strip 29 covers a portion of the interfacial layer 27. The electrolyte layer 28 partially overlaps the edges of the interconnect strip 29. The interconnect strip 29 may comprise any suitable material such as $LaCrO_3$ doped with Mg, Ca or Sr.

A fuel electrode 36 partially surrounds the inner layers of the fuel cell 12 in contact with the electrolyte layer 28. The fuel electrode 36 may comprise a cermet of Ni and/or Co with zirconia doped with yttria, scandia or rare earths, preferably $Ni/(ZrO_2)_{0.92}(Y_2O_3)_{0.08}$. A conductive plate 38, preferably made of Ni, contacts the interconnect strip 29. A compliant connector 40 provides mechanical and electrical connections between the adjacent fuel cells 12. The compliant connector 40 preferably comprises nickel felt.

The interfacial layer 27 provides an interfacial barrier which prevents the interaction between the air electrode 26 and the electrolyte 28. The interfacial layer 27 also acts as an interfacial modifier to reduce the polarization loss through the reduction of the interfacial electrical resistance between the air electrode 26 and the electrolyte 28. The interfacial layer 27 is selected such that it is substantially chemically inert with respect to the air electrode 26 and electrolyte 28 during fabrication and operation of the solid oxide fuel cell. Furthermore, the interfacial layer 27 is preferably a good electronic and oxide ionic mixed conductor.

The interfacial layer 27 preferably comprises a zirconia-based mixed conductor of the formula $Zr_{1-x-y}Y_xTb_yO_z$, wherein x preferably ranges from about 0.12 to about 0.2 and y preferably ranges from about 0.15 to about 0.5. The value of z is a function of the oxygen partial pressure to which it is exposed, and preferably is less than 2. More preferably, x ranges from about 0.14 to about 0.18 and y ranges from about 0.3 to about 0.4. In a particularly preferred composition, x is about 0.15 and y is about 0.37. Compounds of this formula may exhibit oxide ionic and p-type electronic mixed conduction due to the electronic structure of terbium. Unlike typical rare earth oxides, which have the formula $Re_2O_3$, the Tb oxides used for the present invention are of the nominal formula $Tb_4O_7$. The $Tb_4O_7$ composition is also designated as $TbO_{1.75}$ in accordance with the present invention.

By adjusting the terbium content, a desired ionic to electronic conduction ratio of the $Zr_{1-x-y}Y_xTb_yO_z$ may be obtained. For example, the total electrical conductivity for YZTb with terbium in the range of about 20–30 mol % is higher than that of undoped $CeO_2$. In addition, such YZTb interfacial layers provide an electronic to ionic conduction ratio that is better than that for prior art $CeO_2$.

The use of YZTb instead of ceria as an AE/EL interfacial material has many advantages. YZTb has a better thermal expansion match with the YSZ electrolyte than does ceria. Furthermore, the amount of terbium contained in the YZTb can be adjusted in order to provide higher ionic and electronic conductivity than $CeO_2$. A desired electronic to ionic conduction ratio can be obtained by adjusting the terbium doping levels for solid oxide fuel cells operated at different temperatures. This characteristic permits optimization of the electrode reaction kinetics, and may maximize the charge transfer area at the AE/EL interface. In contrast, while doping rare-earth oxides, such as samaria, into $CeO_2$ increases its total electrical conductivity and may also improve somewhat its thermal expansion match with YSZ, such doping results in a reduction in the electronic transport number under oxidizing atmospheres, which makes the material less efficient as an interfacial modifier.

Using YZTb, it is possible to apply a continuous interfacial layer between the air electrode and the electrolyte without deteriorating the adherence of the electrolyte on the supporting air electrode, and without adversely increasing the cell resistance. This continuous layer not only maximizes the charge transfer and air electrode reaction area, but also minimizes the direct contact between the air electrode and the YSZ electrolyte for possible interaction. Due to the combination of both high ionic and electronic conductivity of the interfacial material, efficient operation of the SOFC may be achieved over a wider temperature range and with a wider temperature gradient. Furthermore, the low zirconia activity in the heavily doped YZTb, combined with the fairly low $La_2O_3$ activity in the preferred $LaMnO_3$-based air electrode material, reduces the driving forces for the formation of deleterious interface layers such as $La_2Zr_2O_7$.

In accordance with the present invention, the YZTb is preferably provided in the form of very fine powder prepared by various methods including Pechini, sol-gel, glycene nitrate, or co-precipitation techniques.

The YZTb interfacial material may be applied by vacuum infiltration, EVD, CVD or vapor deposition processes such as sputtering. For example, a vacuum infiltration process can be used to deposit this material on the AE/EL interface. Alternatively, the deposition of the YZTb interfacial area can be incorporated into the electrolyte EVD operation. For example, $ZrCl_4$, $YCl_3$ and $TbCl_3$ may be supplied to a conventional EVD chamber and deposited onto the surface of the air electrode. The EVD chamber can then be used to deposit the electrolyte.

The YZTb interface layer is kept as thin as practical while keeping resistivity to the desired low level. The thickness of the YZTb layer is typically less than about 5 microns and preferably ranges from about 0.1 to about 2 microns, more preferably from about 0.5 to about 1 micron.

In accordance with a preferred embodiment of the present invention, $Sc_2O_3$-stabilized zirconia (ScSZ) is used as the electrolyte layer. The ScSZ is of the formula $Zr_{1-x}Sc_xO_z$, wherein x is preferably from about 0.13 to about 0.26 and z is less than 2. More preferably x is from about 0.14 to about 0.16 and z equals 2−x/2. When ScSZ electrolyte is used, the $Sc_2O_3$ should preferably be provided in the range of from about 6 to about 15 mol %, and more preferably from about 8 to about 10 mol % in order to insure optimum electrical conductivity within a given temperature range for the stable fluorite structure. The use of scandia has been found to improve conductivity, especially at low temperatures. The ScSZ electrolyte layer can be deposited by either EVD, plasma spraying, sol-gel, coating, sintering, spin coating, casting and tape calendaring techniques. The EVD coating process preferably uses gaseous chlorides of $ScCl_3$ and $ZrCl_4$ at pressures of about 1 to 20 torr and about 1150 to 1350° C.

The resultant ScSZ layer preferably has a thickness of less than 50 microns, preferably from about 10 microns to about 40 microns, and more preferably from about 20 microns to about 30 microns.

Table 1 below gives a comparison of the electrolyte resistance between YSZ and ScSZ. The combination of the thickness reduction, e.g., from 40 microns to 20 microns, and the replacement of YSZ with ScSZ reduces the resistance of the ScSZ electrolyte at 700° C. to a value equivalent to that of the 40 micron thick YSZ electrolyte at 1000° C.

TABLE 1

Comparison of Electrolyte Resistance between YSZ and ScSZ

| Electrolyte* | Resistivity (ohm · cm) | | Specific Resistance (ohm · cm$^2$) | |
|---|---|---|---|---|
| | 1000° C. | 700° C. | 40 µm thick 1000° C. | 20 µm thick 700° C. |
| 8YSZ | 11.63 | 131.58 | 0.047 | 0.26 |
| 7.7ScSZ | 3.55 | 23.25 | 0.014 | 0.046 |

*8YSZ = 8 mol % $Y_2O_3$—$ZrO_2$; 7.7ScSZ = 7.7 mol % $Sc_2O_3$—$ZrO_2$.

The use of the ScSZ electrolyte lowers the overall cell resistance. In addition, the use of the YZTb interfacial material with ScSZ in accordance with the present invention further reduces the AE/EL interfacial resistance. Moreover, the mixed electrical conducting properties of the interfacial YZTb layer maximizes the charge transfer region and extends the air electrode reaction from a triple contact point to an increased reaction area which reduces air electrode polarization. The use of YZTb interfacial layer may also provide better catalytic activity for oxygen reduction. This combination of features extends the SOFC operation temperature to a wide range, such as from 650 to 1050° C. Furthermore, the present combination enables the SOFC to be operated with a wide temperature gradient, for example, with the "cold part" of the cell at about 700° C. and the "hot part" of the cell at about 1050° C.

Two cells (A367103 and A367099) were fabricated having an ScSZ electrolyte and YZTb20 at the AE/EL interface. The air electrode was a 30% porous doped lanthanum manganite tube. Specific characteristics for each cell are listed in Table 2.

TABLE 2

| Cell ID | AE $O_2$ DC* (cm$^2$/sec) | Targeted ScSZ Thickness (µm) | Average ScSZ Composition (mol % $Sc_2O_3$) |
|---|---|---|---|
| A367099 | 0.553 | 20 | 12.2 |
| A367103 | 0.553 | 20 | 12.2 |

*AE $O_2$ DC = air electrode oxygen diffusion conductance.

The YZTb20 powder was prepared with the glycine nitrate method and deposited at the AE/EL interface by vacuum infiltration. The ScSZ electrolyte was deposited by the electrochemical vapor deposition (EVD) method. These two cells were electrically tested for 1500 h, and their electrical characteristics were studied in the temperature range of 750–1000° C.

Figure 7:
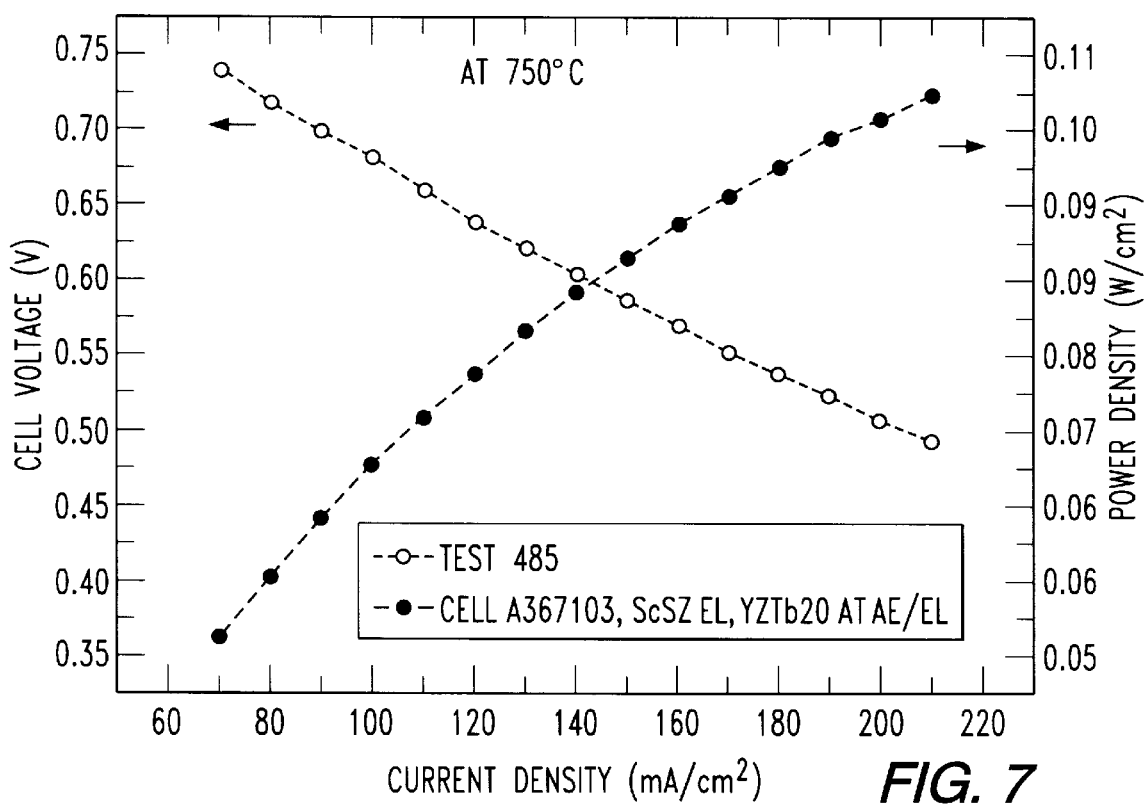
FIG. 7 is a graph showing electrical performance of a solid oxide fuel cell in accordance with the present invention at 750° C.

To compare the electrical performance of these cells with that of standard cells comprising YSZ electrolyte and ceria at the AE/EL interface, two standard cells (A377133 and A377134) with similar air and fuel elect rodes were also fabricated and electrically tested. These cells contained lanthanum manganite-based AE tubes, an YSZ electrolyte with targeted thickness of 20 µm and ceria at the AE/EL interface. The composition of the electrolyte was about $(ZrO_2)_{0.12}(Y_2O_3)_{0.08}$. FIGS. 2–7 compare the electrical characteristics and power densities of these two types of cells in the temperature range of 1000–750° C. In FIG. 7, only the data for the cell with ScSZ electrolyte and YZTb20 at the AE/EL interface are given. No data were taken on the standard cell at 750° C. due to the inability of the cell to be operated at this low temperature in a safe voltage range while loaded at a reasonable current range.

As can be seen from FIGS. 2–7, the SOFC prepared in accordance with the present invention exhibits superior cell voltage and power density performance, particularly at higher current densities, in comparison with the conventional fuel cell. The superior electrical performance of the SOFC of the present invention becomes increasingly pronounced as the fuel cell operating temperature decreases. For example, at an operating temperature of 800° C., both power density and cell voltage are about 25 percent higher for the fuel cell of the present invention at a current density of about 250 mA/cm$^2$.

Figure 8:
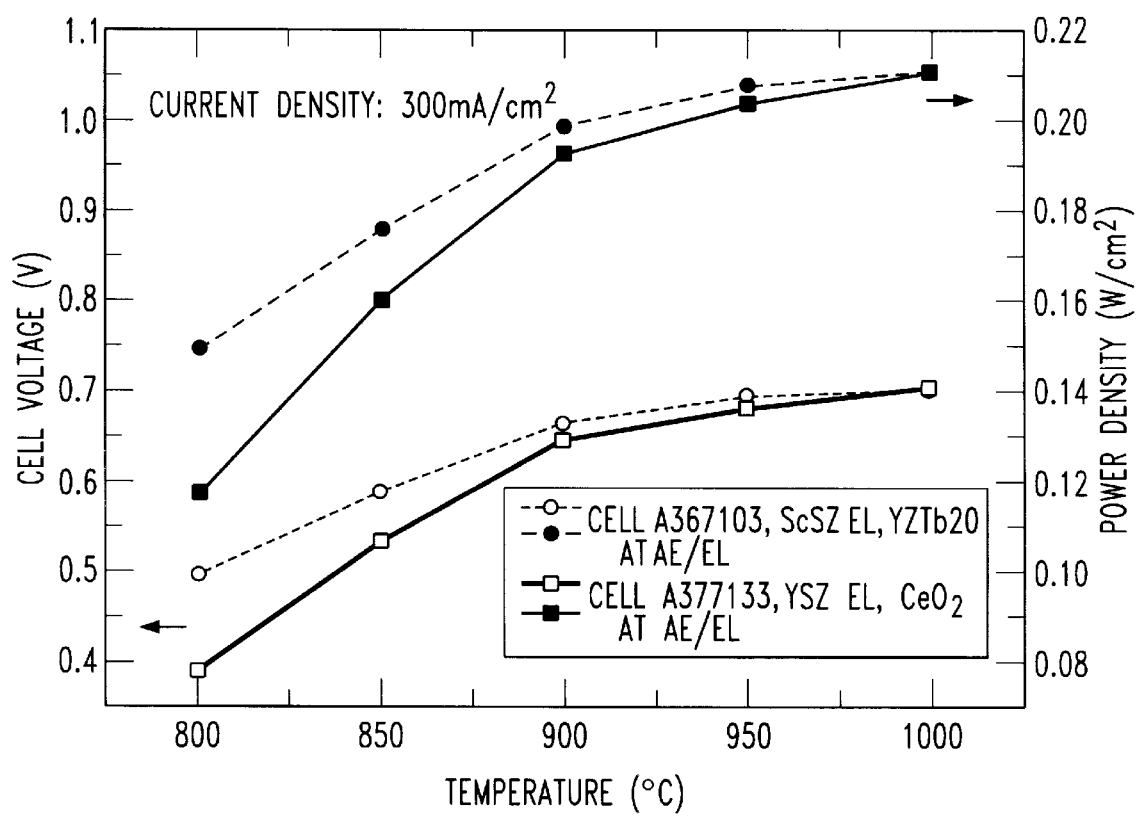
FIG. 8 is a graph showing variations in cell voltage and power density with temperature for a solid oxide fuel cell of the present invention in comparison with a standard cell.

FIG. 8 shows the cell voltage and power density variation with temperature, at a current density of 300 mA/cm$^2$, for these two types of cells. The point at 800° C. for the standard cell was extrapolated from the lower current data, since it could not be loaded to 300 mA/cm$^2$ current density without dropping the cell voltage below a safe operating limit. The performance for these two types of cells is similar at 1000° C., but for the cell of the present invention with a ScSZ electrolyte and YZTb at the AE/EL interface the voltage decrease with temperature is much slower than that for the cell with YSZ electrolyte and ceria at the AE/EL interface. For example, as operating temperature decreases from 1000° C. to 850° C., the fuel cell of the present invention exhibits only about a 16 percent loss in power density and cell voltage in comparison with about a 24 percent loss for the conventional fuel cell. Therefore, the cells with ScSZ electrolyte and YZTb at the AE/EL interface are operable over a wider temperature range than cells with YSZ electrolyte and ceria at the AE/EL interface. Preferably, the present solid oxide fuel cells are capable of operating in a temperature range of from 1000° C. to 850° C. with a loss in power density of less than 20 percent and a loss in cell voltage of less than 20 percent, at a current density of 300 mA/cm$^2$, when the operating temperature of the solid oxide fuel cell is decreased from 1000° C. to 850° C.

While particular embodiments of the present invention have been described above for purposes of illustration, it will be apparent to those skilled in the art that numerous variations, modifications, and adaptations may be made without departing from the invention as set forth in the following claims.

What is claimed is:

1. A solid oxide fuel cell comprising an interfacial material disposed on and between an air electrode and an electrolyte the interfacial material consisting essentially of terbia-stabilized zirconia.

2. The solid oxide fuel cell of claim 1, wherein the terbia-stabilized zirconia is of the formula $Zr_{1-x-y}Y_xTb_yO_z$, wherein x is from about 0.12 to about 0.20, y is from about 0.15 to about 0.5 and z is less than 2.

3. The solid oxide fuel cell of claim 1, wherein the terbia-stabilized zirconia comprises a layer having a thickness of less than about 5 microns.

4. The interfacial material of claim 1, wherein the terbia-stabilized zirconia is a barrier layer effective to control interaction between the air electrode and the electrolyte, which both contact the barrier layer, where the interfacial barrier layer material comprises a continuous layer having a thickness of from about 0.1 to about 2 microns, the air electrode consists essentially of a single layer of doped lanthanum manganite, and where the interfacial material is chemically inert to both air electrode and electrolyte and is effective to act as an interfacial modifier to reduce polarization loss through the reduction of air electrode/electrolyte interfacial electrical resistance.

5. The solid oxide fuel cell of claim 1, wherein the air electrode comprises a material of the formula $La_{1-x-y}Ca_xCe_yMnO_3$, wherein x is from about 0.4 to about 0.55 and y is from about 0.1 to about 0.2.

6. The solid oxide fuel cell of claim 1, wherein the air electrode comprises a material of the formula $La_{1-x-y}Ca_xCe_yMn_{1-z}(Cr)_zO_3$, wherein x is from about 0.4 to about 0.55, y is from about 0.1 to about 0.2 and z is from 0 to about 0.2.

7. The solid oxide fuel cell of claim 1, wherein the air electrode comprises a solid solution of the formula $La_{1-x-w-y}(M_L)_x(Ce)_w(Ln)_yMn_{1-z}(M_s)_zO_3$, wherein $M_L$ is selected from the group consisting of Ca, Sr, Ba and mixtures thereof, Ln is one or a mixture of Pr, Nd, Sm, Eu, Gd, Dy, Er and Yb, $M_s$ comprises Ni, Cr, Fe, Co, Al, In, Sn, Mg or mixtures thereof, w is from 0 to 0.2, x is from 0.2 to 0.55, y is from 0 to 0.5, and z is from 0 to 0.3.

8. The solid oxide fuel cell of claim 1, wherein the air electrode has a perovskite structure of the formula $ABO_3$, wherein the A site comprises La, Ca and Ce and the B site comprises Mn, Cr and Ni.

9. The solid oxide fuel cell of claim 1, wherein the air electrode is substantially cylindrical.

10. The solid oxide fuel cell of claim 1, wherein the electrolyte comprises a material selected from the group consisting of scandia-stabilized zirconia, yttria-stabilized zirconia, ytterbia-stablized zirconia and zirconia stabilized by mixtures of scandia, yttria and ytterbia.

11. The solid oxide fuel cell of claim 1, wherein the electrolyte comprises a material of the formula $Zr_{1-x}Sc_xO_z$, wherein x is from about 0.13 to about 0.26 and z is less than 2.

12. The solid oxide fuel cell of claim 11, wherein the electrolyte comprises from about 6 to about 15 mol % $Sc_2O_3$.

13. The solid oxide fuel cell of claim 12, wherein the electrolyte comprises a layer having a thickness of less than about 50 microns.

14. The solid oxide fuel cell of claim 12, wherein the electrolyte comprises a layer having a thickness of from about 10 to about 40 microns.

15. A method of forming an interfacial material between an air electrode and an electrolyte of a solid oxide fuel cell, the method comprising:

providing a single, substantially cylindrical air electrode having an outer surface;

forming a single layer of interfacial material consisting essentially of terbia-stabilized zirconia on and over at least a portion of the outer surface of the air electrode; and forming a single layer of electrolyte material on and over at least a portion of the layer of interfacial material.

16. The method of claim 15, wherein the layer of interfacial material is formed by vacuum infiltration, electrochemical vapor deposition or chemical vapor deposition.

17. The method of claim 15, wherein the layer of interfacial material is continuous, has a thickness of less than about 5 microns and is a barrier layer effective to control interaction between the air electrode and the electrolyte, which both contact the carrier layer, the air electrode consists essentially of a single layer of doped lanthanum manganite, and where the interfacial material is chemically inert to both air electrode and electrolyte and is effective to act as an interfacial modifier to reduce polarization loss through the reduction of air electrode/electrolyte interfacial electrical resistance.

18. The method of claim 15, wherein the air electrode comprises a solid solution of the formula $La_{1-x-w-y}(M_L)_x(CE)_w(Ln)_yMn_{1-z}(M_s)_zO_3$, wherein $M_L$ is selected from the group consisting of Ca, Sr, Ba and mixtures thereof, Ln is one or a mixture of Pr, Nd, Sm, Eu, Gd, Dy, Er, and Yb and $M_s$ comprises Ni, Cr, Fe, Co, Al, In, Sn, Mg or mixtures thereof in amounts less than 20 mole % of the Mn content, and wherein w is from 0 to about 0.2, x is from about 0.2 to about 0.55, y is from 0 to about 0.5, and z is from 0 to about 0.3.

19. The method of claim 15, wherein the electrolyte comprises scandia-stabilized zirconia.

* * * * *